Patented Nov. 5, 1940

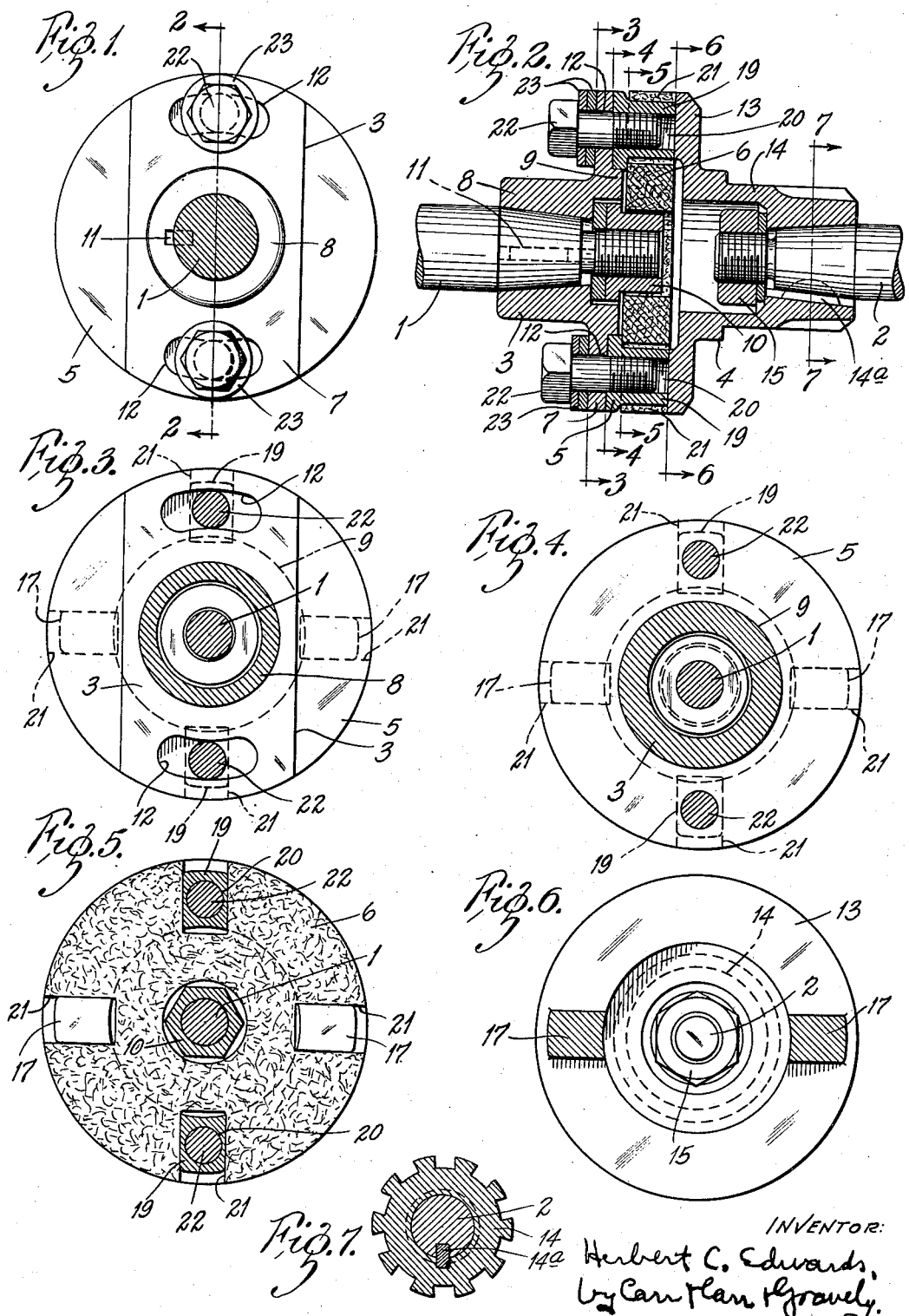

2,220,799

UNITED STATES PATENT OFFICE 2,220,799

COUPLING

Herbert C. Edwards, Massillon, Ohio, assignor to The Timken Roller Bearing Company, Canton, Ohio, a corporation of Ohio Application October 3, 1938, Serial No. 232,910

4 Claims. (Cl. 64—31)

This invention relates to couplings, particularly shaft couplings of the Oldham type, wherein the shaft receiving members may be displaced transversely of their axes of rotation to accommodate misalinement of the connected shafts. The principal object of the invention is to devise a simple and efficient coupling of the above type that can be readily assembled and disassembled and circumferentially adjusted to vary the relative angular positions of the shaft receiving members. The invention consists in the coupling and in the construction, combinations and arrangements of parts hereinafter described and claimed.

In the accompanying drawing, which forms part of this specification and wherein like symbols refer to like parts wherever they occur:

Fig. 1 is an end view of a coupling embodying my invention,

Fig. 2 is a central longitudinal section on the line 2—2 in Fig. 1; and

Figs. 3, 4, 5, 6 and 7 are transverse sections on the lines 3—3, 4—4, 5—5, 6—6 and 7—7, respectively, in Fig. 2.

As shown in the accompanying drawing, my coupling forms a driving connection between rotary shafts 1 and 2, one of which is driven by the other through said coupling. Said coupling comprises four main parts, two metal shaft receiving members 3 and 4, a metal driving ring 5 and a fiber connecting disk 6 interposed between said shaft receiving members.

The shaft receiving member 3 comprises a plate 7 having on one side a central hub portion 8 adapted to receive the shaft 1, and on the other side an annular shoulder 9 disposed concentric with said hub and adapted to snugly fit the opening in the driving ring 5. The bore of the hub portion 8 of the shaft receiving member 3 is tapered to fit the tapered portion of the shaft 1; and the inner end of said bore is counterbored to accommodate and form an annular abutment for a nut 10 which is threaded on the end of said shaft. This arrangement prevents relative axial movement of the shaft 1 and member 3, relative rotary movement thereof being prevented by a key 11. The plate portion 7 of the shaft receiving member 3 has two arcuate slots 12 therein concentric with the axis of the hub 8 thereof.

The other shaft receiving member 4 comprises a circular disk 13 having a hub portion 14 projecting from one side thereof, whose bore is tapered to receive the tapered portion of the shaft 2 and is counterbored to accommodate a nut 15 for firmly seating the hub portion on the tapered portion of said shaft. Said hub and shaft are further secured together by a key 14a. The circular disk portion 13 of the shaft receiving member 4 is provided on its opposite side with a pair of outstanding diametrically opposed driving dogs or lugs 17.

The driving member 5 comprises an annular plate or ring whose central circular opening is adapted to snugly fit the annular shoulder 9 on the shaft receiving member 3. This annular disk 5 is provided on the side remote from the shaft receiving member 3 with two diametrically opposed driving dogs or lugs 19 having threaded bores 20 that extend therethrough parallel with the axis of said driving ring opposite the respective arcuate slots 12 in said shaft receiving member. The size, shape and spacing of the pair of lugs 19 on the driving member 5 corresponds to the size, shape and spacing of the pair of lugs 17 on the shaft receiving member 4.

The fiber connecting disk 6 has a central circular opening therein large enough to accommodate the securing nut 10 for the shaft receiving member 3. Said connecting disk also has four equally spaced parallel sided peripheral notches 21 formed therein that are shaped to snugly receive the driving lugs of the shaft receiving member 4 and the driving member 5. The two driving lugs 17 of the shaft receiving member 4 are engaged with two opposite notches of the connecting member 6 and the two driving lugs 19 of the driving member 5 are adapted to engage the two remaining opposite notches of said connecting member.

The driving member 5 is clamped flatwise to the inner face of the shaft receiving member 3 preferably by means of cap screws 22 that extend through the arcuate slots 12 in the plate portion 7 of said shaft receiving member and are threaded into the registering threaded bores 20 in the driving dogs or lugs 19 of said driving member, suitable lock washers 23 being interposed between the outer face of said shaft receiving member and the heads of said cap screws.

By the arrangement described, the drive is transmitted from one shaft receiving member to the other through the connecting disk and driving ring without any back lash or end play and the lug and notch connections between said disk and the shaft receiving member and driving ring permit relative crosswise movement of these parts and thus accommodates misalinement of the connected shafts. The arcuate cap screw receiving slots in the shaft receiving member 3 permit limited relative rotary adjustment of said member and the driving ring when the cap screws are loosened, thereby permitting the connected shafts to be angularly adjusted relative to each other, after which the cap screws may be tightened to lock the parts in the desired adjusted position.

What I claim is:

1. A coupling comprising two shaft receiving members and a one-piece connecting member therebetween having a series of circumferentially spaced openings entirely therein, one of said shaft receiving members having driving lugs thereon that are slidable in some of said openings along one diameter of said coupling, a driving ring interposed between the opposing end faces of the other of said shaft receiving members and said connecting member and having driving lugs slidable in other of said openings along a diameter of said coupling disposed substantially at right angles to said first mentioned diameter, and means for securing said driving ring to the connecting member opposing inner end face of said other shaft receiving member.

2. A coupling comprising two shaft receiving members and a rigid one-piece connecting member therebetween having four openings entirely therein spaced equally from each other and equidistant from the axis of said connecting member, one of said shaft receiving members having a pair of diametrically opposed driving lugs thereon that are slidable in two of said openings along a diameter passing therethrough, a driving ring interposed between the opposing end faces of the other of said shaft receiving members and said connecting member and having a pair of diametrically opposed lugs slidable in the other two openings along a diameter passing therethrough, said other shaft receiving member having a pair of diametrically opposed arcuate slots therein concentric with the axis thereof, and screws extending through said arcuate slots and threaded into the driving lugs of said driving ring for clamping said driving ring and said other shaft receiving member together endwise against relative rotary movement.

3. A coupling comprising two shaft receiving members, one having a pair of diametrically opposed arcuate slots and an annular shoulder concentric therewith, a member having a central circular opening fitting said annular shoulder and two diametrically opposed driving dogs disposed opposite said arcuate slots and having threaded bores, cap screws passing through said slots and threaded into said bores, the other shaft receiving member having two diametrically opposed lugs disposed in a plane substantially at right angles to the diametral plane of said first mentioned lugs, and a connecting member interposed between said shaft receiving members and having openings therein adapted to receive the respective driving lugs, the connections formed by said lugs and openings permitting independent movement of said shaft receiving members relative to said connecting member radially of said coupling.

4. A coupling comprising two shaft receiving members, one having a pair of diametrically opposed arcuate slots and an annular shoulder concentric therewith, an annular member snugly fitting said annular shoulder and having two diametrically opposed driving dogs with threaded bores therein opposite said arcuate slots, cap screws passing through said slots and threaded into said bores, the other shaft receiving member having two diametrically opposed lugs disposed in a plane substantially at right angles to the diametral plane of said first mentioned lugs, and a connecting disk member interposed between said shaft receiving members and having four equally spaced peripheral notches therein adapted to receive the two pairs of driving lugs, the connections formed by said lugs and openings permitting independent movement of said shaft receiving members relative to said connecting member radially of said coupling.

HERBERT C. EDWARDS.